(12) United States Patent
Nishiyama et al.

(10) Patent No.: US 9,889,819 B2
(45) Date of Patent: Feb. 13, 2018

(54) SMART KEY SYSTEM

(71) Applicant: TOYOTA JIDOSHA KABUSHIKI KAISHA, Toyota-shi, Aichi-ken (JP)

(72) Inventors: Shigeki Nishiyama, Nagoya (JP); Tomoyuki Funayama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/461,024

(22) Filed: Mar. 16, 2017

(65) Prior Publication Data
US 2017/0274871 A1 Sep. 28, 2017

(30) Foreign Application Priority Data
Mar. 23, 2016 (JP) .................. 2016-058980

(51) Int. Cl.
| | |
|---|---|
| B60R 25/24 | (2013.01) |
| E05B 81/56 | (2014.01) |
| B60R 25/01 | (2013.01) |
| H04W 8/00 | (2009.01) |
| H04W 12/06 | (2009.01) |
| H04W 72/12 | (2009.01) |
| G07C 9/00 | (2006.01) |

(52) U.S. Cl.
CPC ............ *B60R 25/241* (2013.01); *B60R 25/01* (2013.01); *E05B 81/56* (2013.01); *H04W 8/005* (2013.01); *G07C 9/00309* (2013.01); *G07C 2009/00769* (2013.01); *H04W 12/06* (2013.01); *H04W 72/1205* (2013.01)

(58) Field of Classification Search
CPC ....... B60R 25/241; B60R 25/01; E05B 81/56; H04W 8/005; G07C 9/00309; G07C 2009/00769
See application file for complete search history.

(56) References Cited

U.S. PATENT DOCUMENTS

| | | | | |
|---|---|---|---|---|
| 6,538,560 | B1 * | 3/2003 | Stobbe | B29C 44/56 340/5.72 |
| 2004/0226529 | A1 * | 11/2004 | Nantz | F02N 11/0807 123/179.2 |
| 2013/0035042 | A1 * | 2/2013 | Matsumoto | H04W 88/04 455/66.1 |

(Continued)

FOREIGN PATENT DOCUMENTS

JP 2014-034768 A 2/2014

Primary Examiner — Thomas Alunkal
(74) Attorney, Agent, or Firm — Oliff PLC

(57) ABSTRACT

A smart key system includes a first transmitting unit, a first receiving unit, and a certification unit that are mounted on a vehicle, and a second receiving unit and a second transmitting unit that are mounted on a portable device. The certification unit performs certification processing of the portable device when the first receiving unit has received a reply signal. The first transmitting unit transmits the polling signal at a transmission timing that is later or earlier than a transmission timing based on the polling signal before the predetermined manipulation is performed, by a predetermined time shorter than a predetermined transmission cycle, when the predetermined manipulation has been performed in a situation where the certification unit does not certify the portable device.

6 Claims, 9 Drawing Sheets

(56) References Cited

U.S. PATENT DOCUMENTS

| | | | |
|---|---|---|---|
| 2015/0077225 A1* | 3/2015 | Proefke | G07C 9/00182 340/5.72 |
| 2015/0120085 A1* | 4/2015 | Sanji | B60R 25/24 701/1 |
| 2015/0291127 A1* | 10/2015 | Ghabra | G07C 9/00309 701/2 |
| 2016/0267735 A1* | 9/2016 | Hamada | G07C 9/00309 |

* cited by examiner

SMART KEY SYSTEM

INCORPORATION BY REFERENCE

The disclosure of Japanese Patent Application No. 2016-058980 filed on Mar. 23, 2016 including the specification, drawings and abstract is incorporated herein by reference in its entirety.

BACKGROUND

1. Technical Field

The present disclosure relates to a smart key system.

2. Description of Related Art

In the related art, smart key systems that transmit a polling signal from a vehicle (vehicle-mounted device) to a predetermined area (for example, the vicinity of a door) outside a vehicle compartment in a fixed transmission cycle are known. In such smart key systems, if a user who possesses a portable device enters the predetermined area outside the vehicle compartment, the portable device receives the polling signal and transmits a reply signal to the vehicle. Since the vehicle-mounted device can determine that the portable device is in the predetermined area outside the vehicle compartment if the reply signal is received, certification processing of the portable device is performed. Then, when the user performs a predetermined manipulation on the vehicle after the certification of the portable device is completed (has succeeded), vehicle-mounted equipment can be made to perform a predetermined operation (for example, a locking/unlocking device of the door of the vehicle is made to perform an unlocking operation, that is, unlock the door).

In such smart key systems, a technique of offsetting the transmission timing of the polling signal by a period shorter than the transmission cycle is suggested (for example, refer to Japanese Patent Application Publication No. 2014-34768 (JP 2014-34768 A).

According to the technique disclosed in JP 2014-34768 A, in a case where noise in the same frequency band as the polling signal is output in the same transmission cycle as the polling signal from a noise source near the vehicle, the portable device can suppress a situation where the polling signal cannot be received well due to noise overlap or the like.

For example, in a case where another vehicle that transmits the same polling signal is parked adjacent to a user's own vehicle, if the transmission cycles of the polling signals of the user's own vehicle and the other vehicle are the same and the transmission timings of the polling signals also overlap each other, the portable device may be unable to receive the polling signal of the user's own vehicle. In contrast, by shifting the transmission timing of the polling signal as in JP 2014-34768 A, it is possible to avoid overlap between the polling signal of the other vehicle and the polling signal of the user's own vehicle, and the portable device can receive the polling signal.

SUMMARY

However, in JP 2014-34768 A, as an example, a configuration in which the transmission timing of a polling signal is offset in a case where there is no reply from a portable device to a vehicle even if the polling signal is transmitted multiple times is adopted. That is, since the transmission timing of the polling signal is changed regardless of needs, a user's convenience may be lowered such that it is necessary to wait for the polling signal to be transmitted multiple times in a situation where the transmission timings of the polling signal and noise overlap each other.

Additionally, in JP 2014-34768 A, as another example, a configuration in which a trigger signal for changing the transmission timing is transmitted from the portable device to the vehicle in a case where the portable device has detected noise is adopted. For that reason, since the portable device always needs to maintain a state where noise can be detected, the consumption current of the portable device may increase vainly and the battery lifespan of the portable device may decrease.

The disclosure provides a smart key system that can reduce the influence of noise while suppressing a decrease in a user's convenience or a decrease in the battery lifespan of a portable device.

A smart key system in an aspect of the disclosure that causes vehicle-mounted equipment to perform a predetermined operation based on two-way communication between a vehicle and a portable device includes a first transmitting unit mounted on the vehicle and configured to transmit a polling signal to a predetermined region outside a vehicle compartment in a predetermined transmission cycle; a first receiving unit mounted on the vehicle and configured to receive a signal transmitted from the portable device; a second receiving unit mounted on the portable device and configured to receive a signal transmitted from the first transmitting unit; a second transmitting unit mounted on the portable device and configured to transmit a reply signal to the vehicle when the second receiving unit has received the polling signal; a certification unit mounted on the vehicle and configured to perform certification processing of the portable device when the first receiving unit has received the reply signal; and a control unit mounted on the vehicle and configured to cause the vehicle-mounted equipment to perform the predetermined operation when a predetermined manipulation has been performed in the vehicle and the certification unit has certified the portable device. The first transmitting unit is configured to transmit the polling signal at a transmission timing that is later or earlier than a transmission timing based on the polling signal before the predetermined manipulation is performed, by a predetermined time shorter than the predetermined transmission cycle, when the predetermined manipulation has been performed in a situation where the certification unit does not certify the portable device.

According to the above aspect, the first transmitting unit mounted on the vehicle transmits the polling signal to the predetermined region outside the vehicle compartment in the predetermined transmission cycle, the second receiving unit mounted on the portable device receives the polling signal, the second transmitting unit mounted on the portable device transmits the reply signal to the vehicle, and the first receiving unit mounted on the vehicle receives the reply signal. Additionally, the certification unit mounted on the vehicle performs the certification processing of the portable device in a case where the first receiving unit has received the reply signal from the portable device, and the control unit mounted on the vehicle makes the vehicle-mounted equipment perform the predetermined operation in a case where the predetermined manipulation has been performed in the vehicle and the certification unit has certified the portable device. The first transmitting unit transmits the polling signal at the transmission timing that is later or earlier than the transmission timing based on the polling signal before the predetermined manipulation is performed, by the predetermined time shorter than the predetermined transmission cycle, in a case where the predetermined manipulation has been performed in a situation where the certification unit does not certify the portable device. Therefore, even in a case where a noise source that is in the same band as the polling signal and overlaps the polling signal in transmission cycle and transmission timing is near the vehicle, the overlap of the transmission timing between the polling signal and the noise can be eliminated. For that reason, the portable device is able to discriminate the polling signal from the noise and can receive the polling signal. Additionally, generally, if a user who possesses the portable device enters the predetermined region, the portable device receives the polling signal and transmits the reply signal to the vehicle. Therefore, the certification of the portable device is first completed, and a predetermined manipulation that is a trigger for making the vehicle-mounted equipment perform the predetermined operation by the user is then performed. However, in a case where a predetermined manipulation for the vehicle has been performed in a situation where the certification of the portable device is not completed, the portable device can determine that the polling signal cannot be received or the timing when the polling signal is received is delayed, due to the influence of the noise. Therefore, it is possible to change the transmission timing of the polling signal after a need is determined. As a result, since needs, such as waiting for the transmission timing of the polling signal to vary as in the technique disclosed in JP 2014-34768 A, are eliminated, a decrease in a user's convenience can be suppressed. Additionally, since there is also no need such that the portable device always detects noise unlike as in the technique disclosed in JP 2014-34768 A, a decrease in the battery lifespan of the portable device can also be suppressed. That is, according to the first embodiment, the influence of noise can be reduced while suppressing a decrease in a user's convenience or a decrease in the battery lifespan of the portable device.

Additionally, in the above aspect, the vehicle-mounted equipment may be a locking/unlocking device of a door of the vehicle, and the predetermined operation may be an unlocking operation of the door.

According to the above configuration, on the conditions that the certification of the portable device based on the polling signal is completed and the predetermined manipulation is performed, the door of the vehicle can be unlocked, and the influence of noise when unlocking the door based on the polling signal can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments for carrying out the disclosure will be described with reference to the drawings.

Figure 1:
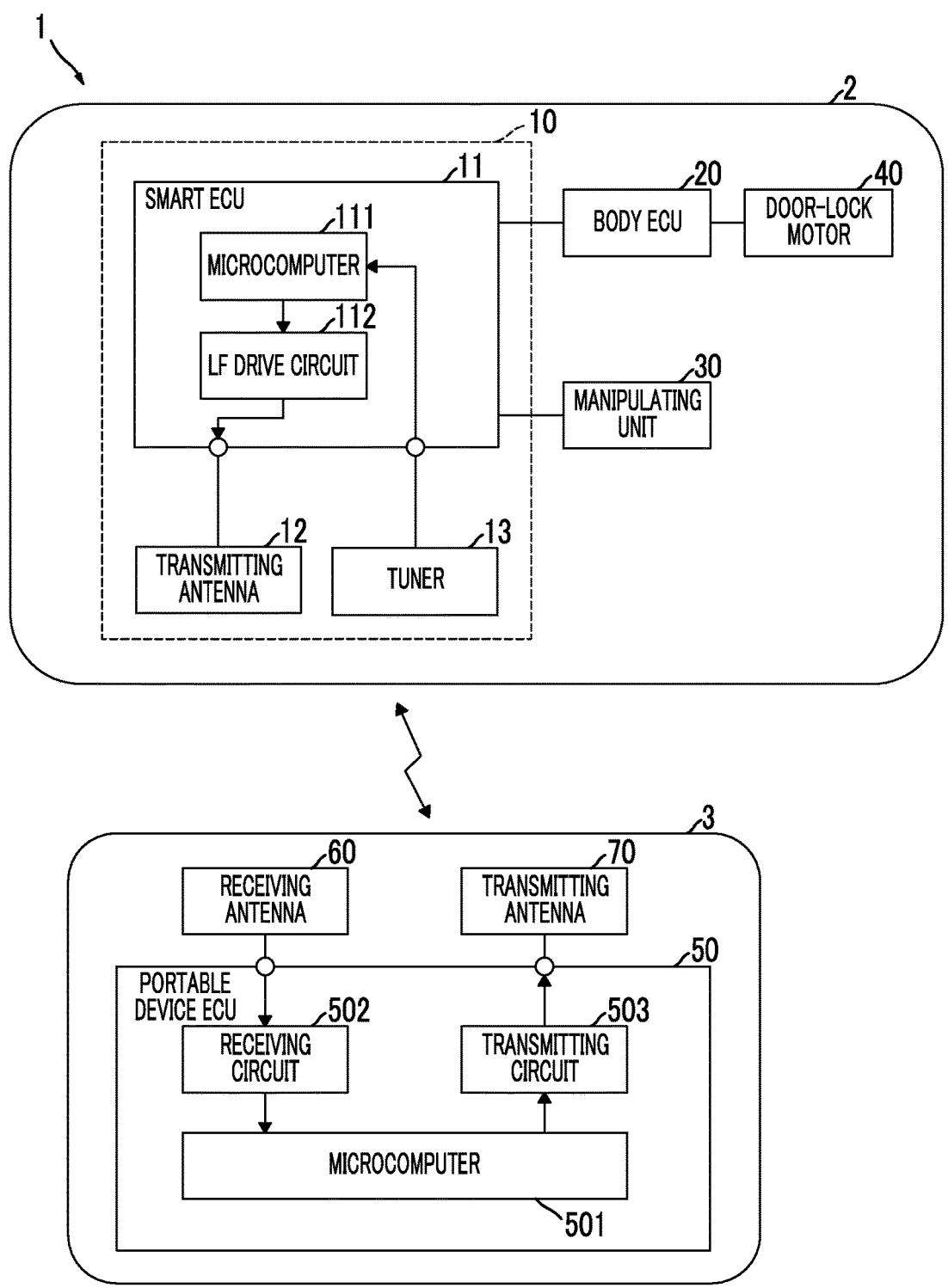
FIG. 1 is a configuration view schematically illustrating an example of the configuration of a smart key system.

FIG. 1 is a configuration view schematically illustrating an example of the configuration of a smart key system 1 related to the present embodiment.

The smart key system 1 causes vehicle-mounted equipment of the vehicle 2 to perform a predetermined operation, on the basis of two-way communication between a vehicle 2 and a portable device (smart key) 3. For example, the vehicle 2 (specifically, a vehicle-mounted device 10 to be described below) transmits a polling signal in a low frequency (LF) band to a predetermined region outside a vehicle compartment in a fixed transmission cycle, and if a user who possesses the portable device 3 enters the predetermined region, the portable device 3 receives the polling signal. Then, the portable device 3 that receives the polling signal transmits a reply signal in the radio frequency (RF) band to the vehicle 2, and the vehicle-mounted device 10 starts certification processing of the portable device 3 if the reply signal is received. By using this certification function, a smart entry function of enabling a predetermined vehicle-mounted equipment to perform the predetermined operation simply with a predetermined manipulation being performed on a manipulating unit 30 to be described below by a user who possesses the portable device 3 can be realized. By virtue of the smart entry function, for example, a locking/unlocking device (a door-lock motor 40 to be described below) of a door of the vehicle 2 may be made to perform an unlocking operation, that is, may be made to unlock the door of the vehicle 2. Additionally, for example, a power window device of the vehicle 2 may be made to perform an opening operation of a side window, that is, may be made to open the side window. Additionally, for example, a movable roof device (a sunroof, an electric soft top, an electric hardtop, or the like) of the vehicle 2 may be made to perform an opening operation, that is, may be made to open the movable roof device. Hereinafter, as an example, description will be made on the premise that the predetermined vehicle-mounted equipment is the door-lock motor 40 and the predetermined operation is the unlocking operation.

In addition, in the present embodiment, the "door" is used in a concept including not only a front seat door, a rear seat door, and the like for allowing a passenger of the vehicle 2 to get on and off but also a lift gate that performs unloading of loads of the vehicle 2, a backdoor, a trunk lid, and the like.

The vehicle 2 includes the vehicle-mounted device 10, a body electronic control unit (ECU) 20, the manipulating unit 30, and the door-lock motor 40.

The vehicle-mounted device 10 drives the door-lock motor 40 and unlocks the door of the vehicle 2, on the basis of transmission and reception of a signal between vehicle-mounted device 10 and the portable device 3. The vehicle-mounted device 10 includes a smart ECU 11, a transmitting antenna 12, and a tuner 13.

The smart ECU 11 is an electronic control unit that executes main control processing in the smart key system 1. The smart ECU 11 includes a microcomputer 111 and an LF drive circuit 112.

The microcomputer 111 includes a CPU, a ROM, a RAM, an I/O, an internal memory, and the like, and realizes various kinds of control processing by executing various programs stored in the ROM using the CPU. Hereinafter, a functional block of the microcomputer 111 will be described with reference to FIG. 2.

Figure 2:
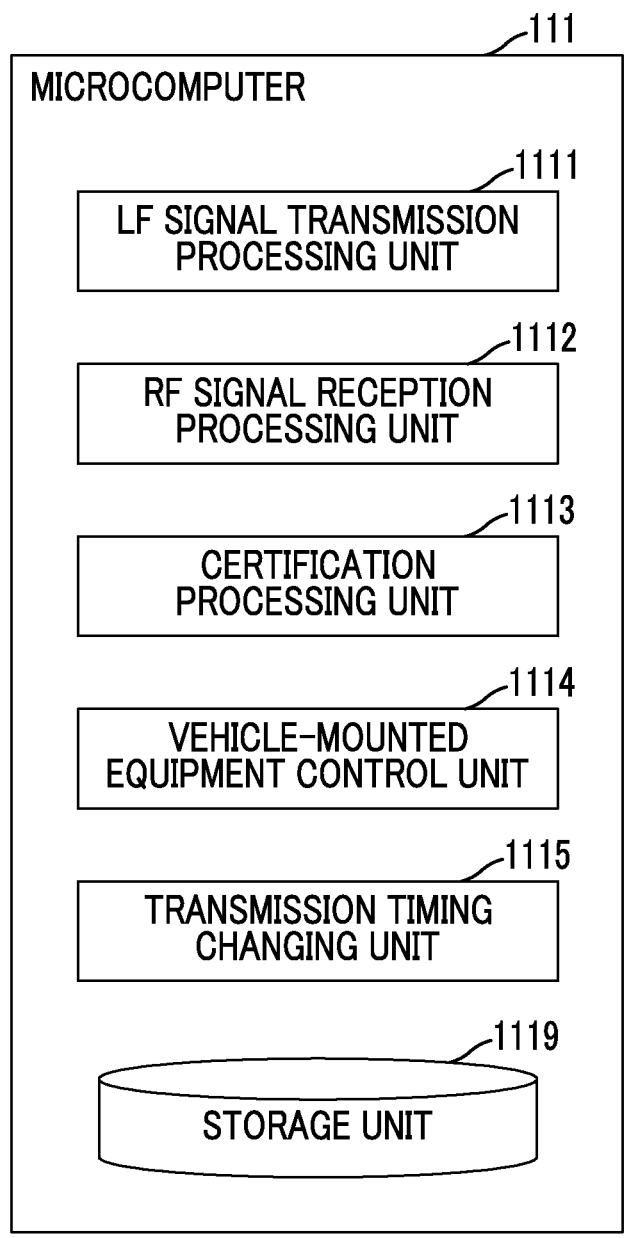
FIG. 2 is a functional block diagram of a microcomputer within a smart ECU.

FIG. 2 is a functional block diagram of the microcomputer 111. The microcomputer 111 includes an LF signal transmission processing unit 1111 (an example of a first transmitting unit), an RF signal reception processing unit 1112 (an example of a first receiving unit), a certification processing unit 1113, a vehicle-mounted equipment control unit 1114 (an example of a control unit), a transmission timing changing unit 1115, and a storage unit 1119. Respective functions of the LF signal transmission processing unit 1111, the RF signal reception processing unit 1112, the certification processing unit 1113, the vehicle-mounted equipment control unit 1114, and the transmission timing changing unit 1115 are realized by executing one or more programs stored in the ROM using the CPU. Additionally, the storage unit 1119 is realized as a storage region that is specified in advance in the nonvolatile internal memory.

The LF signal transmission processing unit 1111 performs the processing of transmitting a predetermined signal (an LF signal) with an electric wave in the LF band via the LF drive circuit 112 and the transmitting antenna 12. Specifically, the LF signal transmission processing unit 1111 generates transmission data and outputs the transmission data to the LF drive circuit 112, and the LF drive circuit 112 modulates the transmission data into the LF signal and outputs the modulated LF signal from the transmitting antenna 12 to the outside of the vehicle compartment.

In addition, electric waves having a frequency of 30 kHz to 300 kHz are included in the electric waves in the LF band.

For example, the LF signal transmission processing unit 1111 performs the processing of transmitting the polling signal for detecting the portable device 3 to the predetermined region outside the vehicle compartment in a predetermined transmission cycle T (for example, a cycle of 300 ms). Additionally, for example, the LF signal transmission processing unit 1111 transmits a wake signal to the predetermined region outside the vehicle compartment, in a case where the predetermined manipulation (for example, a touch manipulation of the above touch sensor, a push manipulation of a trigger switch, or the like) of requesting the manipulating unit 30 to unlock the door of the vehicle 2 is performed, in a situation where the authenticity of the portable device 3 by the certification processing unit 1113 is not authenticated. The wake signal is a trigger that wakes up the portable device 3 (brings about a wake state) from a power-saving state where, for example, only minimum functions, such as a reception function of an RF signal, are started.

The RF signal reception processing unit 1112 performs the processing of receiving an electric wave in the RF band from the outside of the vehicle 2 via the tuner 13, for example, the RF signal (the reply signal or a response signal to be described below) transmitted from the portable device 3. Specifically, the RF signal reception processing unit 1112 receives the RF signal (that is, the transmission data from the portable device 3) demodulated by the tuner 13.

In addition, electric waves (300 MHz to 3 GHz) are included in the electric waves in the RF band.

The certification processing unit 1113 performs the processing (certification processing is only hereinafter referred to as) of certifying the authenticity of the portable device 3, in a case where the RF signal reception processing unit 1112 receives the reply signal from the portable device 3. As methods of certifying the authenticity of the portable device 3, for example, arbitrary methods, such as collation of an identifier unique to the portable device 3, challenge response certification, or combinations thereof, are adopted. In the case of the challenge response certification, the certification processing unit 1113 generates an encryption code (a so-referred to as "challenge") capable of being decrypted with an encryption key set unique to the portable device 3, and sends a transmission request to the LF signal transmission processing unit 1111. Additionally, the LF signal transmission processing unit 1111 transmits a signal (hereinafter referred to as a "challenge signal") including the encryption code ("challenge") to the portable device 3 via the LF drive circuit 112 and the transmitting antenna 12 according to the transmission request. Additionally, the portable device 3 transmits a signal (hereinafter referred to a "response signal") including a decryption result (a so-called "response") of the encryption code included in the challenge signal to the vehicle-mounted device 10, if the challenge signal is received. Then, the certification processing unit 1113 compares the decryption result caused by the encryption key of the "challenge" with the "response", and in a case where there is coincidence, the authenticity of the portable device 3 is certified (certification success).

The vehicle-mounted equipment control unit 1114 performs the control processing of making the predetermined vehicle-mounted equipment perform the predetermined operation in a case where the certification processing unit 1113 certifies the authenticity of the portable device 3 and the predetermined manipulation is performed on the manipulating unit 30. Specifically, the certification processing unit 1113 performs, as an example, the processing of unlocking the door of the vehicle 2. Specifically, the vehicle-mounted equipment control unit 1114 outputs an unlocking request to the body ECU 20. Accordingly, the body ECU 20 drives the door-lock motor 40, and unlocks the door of the vehicle 2.

The transmission timing changing unit 1115 performs the processing of changing the transmission timing of the polling signal. Since the polling signal is transmitted in the transmission cycle T as described above, if the transmission is started, the polling signal is transmitted at a transmission timing (that is, the timing when a period of an integer multiple (≥1) of the transmission cycle T has passed on the basis of the transmitting time of a first signal) that is determined by a first signal used as a reference). In contrast, the transmission timing changing unit 1115 performs the processing of changing the transmission timing of the polling signal by a predetermined time A shorter than the transmission cycle T. The details will be described below.

In addition, the predetermined time A is an adaptation value that is specified in advance on the basis of the specifications (the transmission cycle T, the output time of the signal, or the like) of the polling signal, an assumed noise source, or the like.

The storage unit 1119 stores an identifier, an encryption key, and the like that are unique to the portable device 3 to be used in the processing in the certification processing unit 1113 on the basis of registration processing that is performed in advance.

Returning to FIG. 1, the LF drive circuit 112 modulates the transmission data input from the LF signal transmission processing unit 1111, and outputs the LF signal to the transmitting antenna 12.

The transmitting antenna 12 transmits the LF signal input from the LF drive circuit 112 as an electric wave toward the outside of the vehicle compartment. The transmitting antenna 12 is built in, for example, a door handle of each door of the vehicle 2.

The tuner 13 receives and demodulates the electric wave in the RF band from the outside of the vehicle compartment, for example, the RF signal transmitted from the portable device 3, and outputs the demodulated RF signal (transmission data from the portable device 3) to the smart ECU 11. The tuner 13 is installed, for example, in such a manner that the tuner is covered with a trim within a trunk of the vehicle 2.

The body ECU 20 is an electronic control unit that performs drive control of the door-lock motor 40 and the like. The body ECU 20 drives the door-lock motor 40 and causes the door-lock motor to perform an unlocking operation, according to an unlocking request received from the smart ECU 11 (specifically, the vehicle-mounted equipment control unit 1114).

The manipulating unit 30 receives the predetermined manipulation in which the user makes the predetermined vehicle-mounted equipment perform the predetermined operation, specifically, the predetermined manipulation in which the user of the vehicle 2 requests unlocking of a door, as an example. The manipulating unit 30 is, for example, a touch sensor built in a door handle of the vehicle 2, a trigger switch provided in the surface of the door handle, or the like. The manipulating unit 30 is connected so as to be communicable with the smart ECU 11 through a one-to-one communication line, or the like, and outputs a signal corresponding to the received predetermined manipulation to the smart ECU 11.

The door-lock motor 40 is an example of the vehicle-mounted equipment, and is a known electric actuator (locking/unlocking device) that performs locking and unlocking of the door of the vehicle 2.

The portable device 3 includes a portable device ECU 50, a receiving antenna 60, and a transmitting antenna 70.

The portable device ECU 50 is an electronic control unit that performs various kinds of control processing in the portable device 3. The portable device ECU 50 includes a microcomputer 501, a receiving circuit 502, and a transmitting circuit 503.

The microcomputer 501 includes a CPU, a ROM, a RAM, an I/O, a nonvolatile internal memory, and the like, and realizes various kinds of control processing by executing various programs stored in the ROM using the CPU. Hereinafter, a functional block of the microcomputer 501 will be described with reference to FIG. 3.

Figure 3:
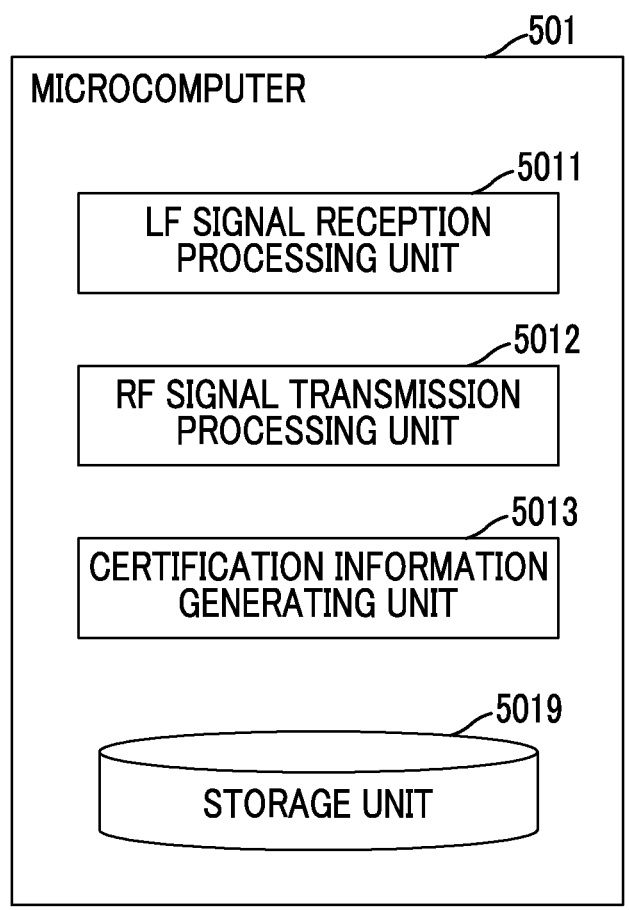
FIG. 3 is a functional block diagram of a microcomputer within a portable ECU.

FIG. 3 is a functional block diagram of the microcomputer 501. The microcomputer 501 includes an LF signal reception processing unit 5011 (an example of a second receiving unit), an RF signal transmission processing unit 5012 (an example of a second transmitting unit), a certification information generating unit 5013, and a storage unit 5019. Respective functions of the LF signal reception processing unit 5011, the RF signal transmission processing unit 5012, and the certification information generating unit 5013 are realized by executing one or more programs stored in the ROM using the CPU. Additionally, the storage unit 5019 is realized as a storage region that is specified in advance in the nonvolatile internal memory.

The LF signal reception processing unit 5011 performs the processing of receiving the electric wave in the LF band from the outside, for example, the LF signal (the polling signal, the wake signal, or the challenge signal) transmitted from the vehicle-mounted device 10, via the receiving antenna 60 and the receiving circuit 502. Specifically, the LF signal reception processing unit 5011 receives the LF signal (the transmission data from the vehicle-mounted device 10) that has been received in the receiving antenna 60 and demodulated in the receiving circuit 502.

The RF signal transmission processing unit 5012 performs the processing of transmitting the RF signal to the vehicle 2 (specifically, the vehicle-mounted device 10) via the transmitting circuit 503 and the transmitting antenna 70. Specifically, the RF signal transmission processing unit 5012 generates transmission data and outputs the transmission data to the transmitting circuit 503, and the transmitting circuit 503 modulates the transmission data into the RF signal and outputs the modulated RF signal from the transmitting antenna 70 to the outside of the vehicle compartment.

For example, the RF signal transmission processing unit 5012 performs the processing of transmitting a reply signal to the vehicle 2, in a case where the LF signal reception processing unit 5011 receives the polling signal or the wake signal from the vehicle-mounted device 10. Additionally, the RF signal transmission processing unit 5012 transmits the response signal to the vehicle, according to a transmission request from the certification information generating unit 5013.

The certification information generating unit 5013 generates certification information (the unique identifier, the unique "response", and the like), on the basis of information (for example, an identifier, an encryption key, and the like that are unique to the portable device 3) stored in the storage unit 5019, in a case where the LF signal reception processing unit 5011 receives the challenge signal from the vehicle-mounted device 10. Then, the certification information generating unit 5013 sends a transmission request of an RF signal (response signal) including the certification information in the RF signal transmission processing unit 5012.

The storage unit 5019 stores the information (for example, the unique identifier, the unique encryption key, and the like) for generating the certification information on the basis of registration processing that is performed in advance.

Next, a processing flow of the smart entry function exhibited by the smart key system 1 related to the present embodiment will be described with reference to FIGS. 4 to 6.

Figure 4:
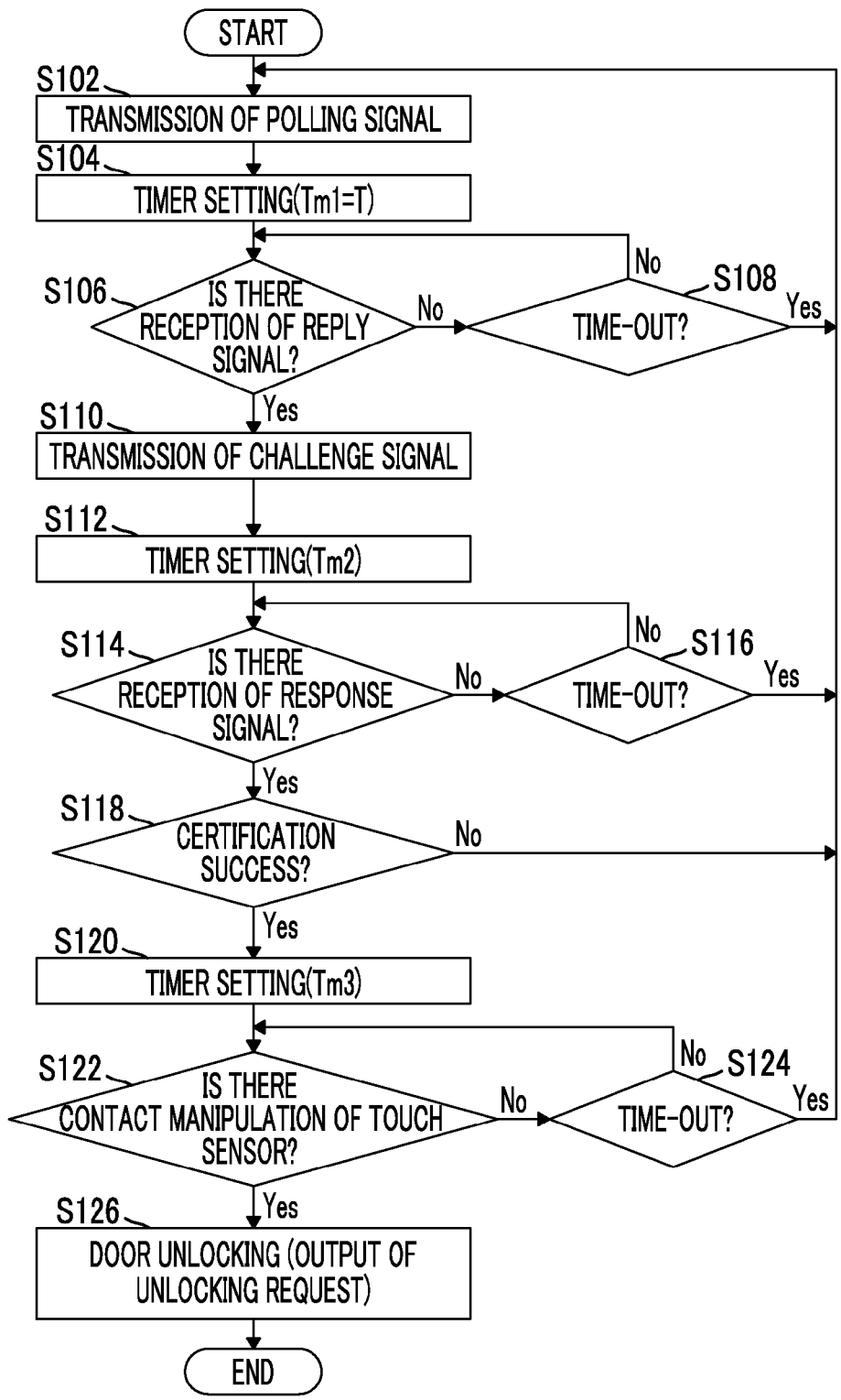
FIG. 4 is a flowchart schematically illustrating an example of first smart entry processing in a vehicle-mounted device.
Figure 5:
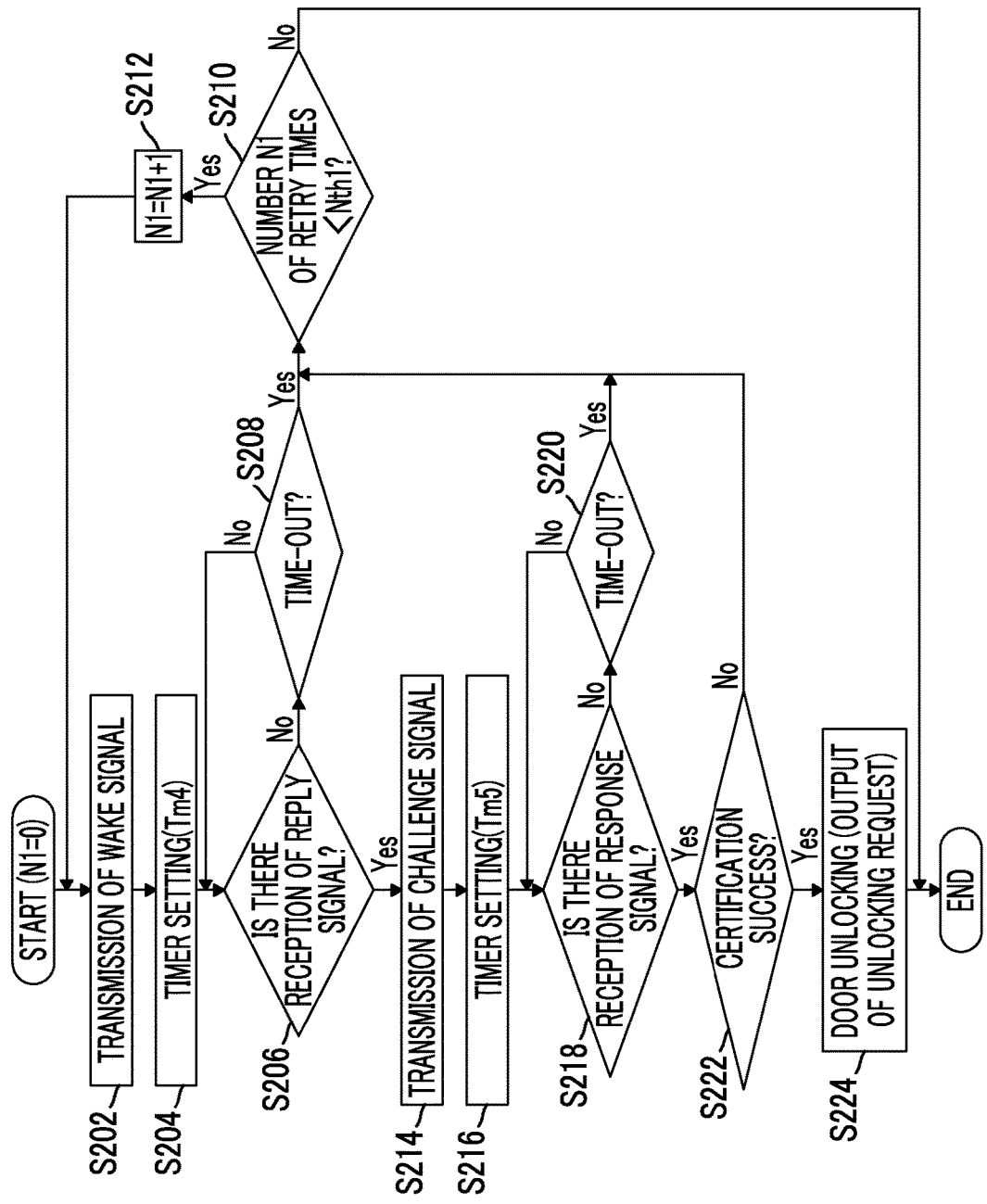
FIG. 5 is a flowchart schematically illustrating an example of second smart entry processing in a vehicle-mounted device.
Figure 6:
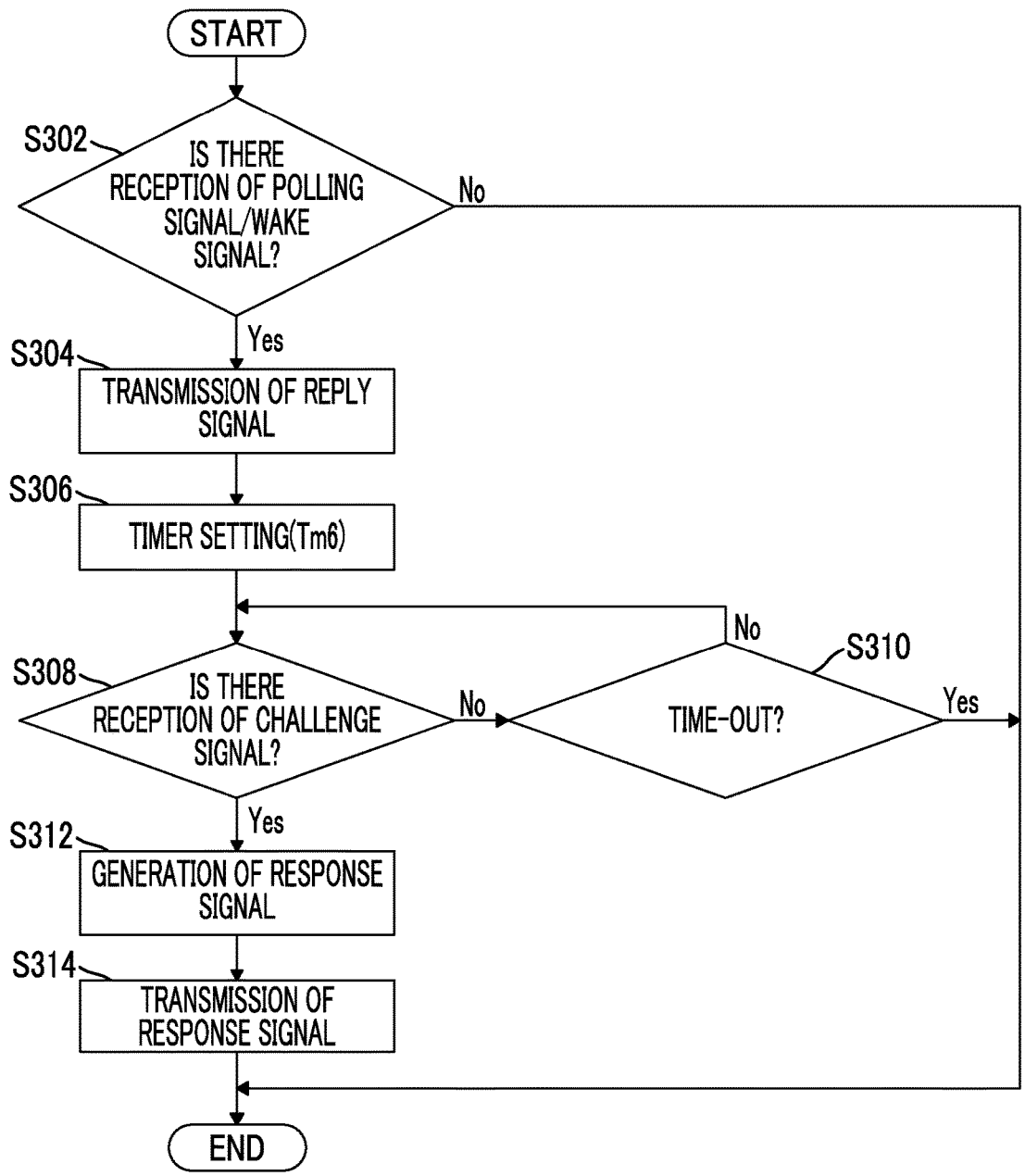
FIG. 6 is a flowchart schematically illustrating an example of processing in a portable device.

FIGS. 4 to 6 are flowcharts schematically illustrating an example of the smart entry processing performed by the smart key system 1 related to the present embodiment. FIG. 4 is a flowchart schematically illustrating an example of first smart entry processing in the vehicle-mounted device 10. FIG. 5 is a flowchart schematically illustrating an example of second smart entry processing in the vehicle-mounted device 10. FIG. 6 is a flowchart schematically illustrating an example of the smart entry processing in the portable device 3.

The processing based on the flowchart of FIG. 4 is executed, for example, in a case where the door of the vehicle 2 is locked during the period of the completion of end processing after ignition-OFF (IG-OFF) of the vehicle 2 to ignition-ON (IG-OFF). Provided that the predetermined manipulation has been performed on the manipulating unit 30 in a situation where the portable device 3 is not certified (in other words, under the execution of processing of Steps S102 to S122 (to be described below) of the flowchart of FIG. 4), the processing based on the flowchart of FIG. 4 is interrupted, and the processing based on the flowchart of FIG. 5 is started. In a case where the LF signal transmission processing unit 1111 receives a polling start request based on the processing of the flowchart of FIG. 7 to be described below from the transmission timing changing unit 1115 after the start of the processing based on the flowchart of FIG. 5, the processing based on the flowchart of FIG. 4 is resumed. Additionally, the processing based on the flowchart of FIG. 6 is repeatedly executed at predetermined time intervals. Additionally, in the present example, description will be made on the premise that a certification method of certifying the authenticity of the portable device 3 explains is challenge response certification.

First, the first smart entry processing in the vehicle-mounted device 10 of FIG. 4 will be described.

In Step S102, the LF signal transmission processing unit 1111 performs the processing of transmitting the polling signal to the predetermined region outside the vehicle compartment.

In Step S104, the LF signal transmission processing unit 1111 sets a timer Tm1 (Tm1=T) equivalent to the transmission cycle T of the polling signal.

In Step S106, the RF signal reception processing unit 1112 determines whether or not a reply signal from the portable device 3 has been received. The RF signal reception processing unit 1112 proceeds to Step S108 in a case where no reply signal from the portable device 3 is received, and proceeds to Step S110 in a case where the reply signal from the portable device 3 has been received.

In Step S108, the LF signal transmission processing unit 1111 determines whether or not the timer Tm1 has been timed out. The LF signal transmission processing unit 1111 returns to Step S106 and repeats the processing of Step S106, in a case where the timer Tm1 is not timed out. On the other hand, in a case where the timer Tm1 has been timed out, the LF signal transmission processing unit 1111 returns to Step S102 and transmits the polling signal, resets the timer Tm1 (Tm1=T) in Step S104, and repeats the processing of Step S106.

In Step S110, the LF signal transmission processing unit 1111 transmits the challenge signal to the predetermined region outside the vehicle compartment according to a transmission request from the certification processing unit 1113.

In Step S112, the LF signal transmission processing unit 1111 sets a timer Tm2 corresponding to a standby time of the challenge signal.

In Step S114, the RF signal reception processing unit 1112 determines whether or not the response signal has been received from the portable device 3. The RF signal reception processing unit 1112 proceeds to Step S116 in a case where no response signal is received from the portable device 3, and proceeds to Step S118 in a case where the response signal has been received from the portable device 3.

In Step S116, the LF signal transmission processing unit 1111 determines whether or not the timer Tm2 has been timed out. The LF signal transmission processing unit 1111 returns to Step S114 and repeats its processing, in a case where the timer Tm2 is not timed out. On the other hand, in a case where the timer Tm2 has been timed out, the LF signal transmission processing unit 1111 returns to Step S102 and transmits the polling signal, resets the timer Tm1 (Tm1=T) in Step S104, and repeats the processing of Step S106.

In Step S118, the certification processing unit 1113 compares the "response" included in the response signal received by that RF signal reception processing unit 1112 with the decryption result of the "challenge" generated by the certification processing unit 1113, and determines whether or not there is coincidence. The certification processing unit 1113 proceeds to Step S120 in a case where there is coincidence, that is, in a case where the certification of the authenticity of the portable device 3 has succeeded. On the other hand, the certification processing unit 1113 returns to Step S102 in a case where there is no coincidence, that is, in a case where the certification of the authenticity of the portable device 3 has failed. Then, in Step S104, the LF signal transmission processing unit 1111 transmits the polling signal, resets the timer Tm1 (Tm1=T), and repeats the processing of Step S106.

In Step S120, the vehicle-mounted equipment control unit 1114 sets a timer Tm3 corresponding to a standby time of the predetermined manipulation for the manipulating unit 30.

In Step S122, the vehicle-mounted equipment control unit 1114 determines whether or not the predetermined manipulation for the manipulating unit 30 has been performed. The vehicle-mounted equipment control unit 1114 proceeds to Step S124 in a case where the predetermined manipulation for the manipulating unit 30 is not performed, and proceeds to Step S126 in a case where the predetermined manipulation has been performed.

In Step S124, the vehicle-mounted equipment control unit 1114 determines whether or not the timer Tm3 has been timed out. The vehicle-mounted equipment control unit 1114 returns to Step S122 and repeats its processing, in a case where the timer Tm3 is not timed out. On the other hand, in a case where the timer Tm3 has been timed out, the vehicle-mounted equipment control unit 1114 returns to Step S102. Then, in Step S104, the LF signal transmission processing unit 1111 transmits the polling signal, resets the timer Tm1 (Tm1=T), and repeats the processing of Step S106.

In Step S126, the vehicle-mounted equipment control unit 1114 unlocks the door of the vehicle 2, that is, outputs an unlocking request to the body ECU 20 and ends the current processing.

Subsequently, the second smart entry processing in the vehicle-mounted device 10 of FIG. 5 will be described.

In addition, the number N1 of retry times to be described below is set in advance as an initial value "0" at the start of the flowchart of FIG. 5.

In Step S202, the LF signal transmission processing unit 1111 transmits the wake signal to the predetermined region outside the vehicle compartment.

In Step S204, the LF signal transmission processing unit 1111 sets a timer Tm4 corresponding to a standby time of the wake signal.

In Step S206, the RF signal reception processing unit 1112 determines whether or not a reply signal from the portable device 3 has been received. The RF signal reception processing unit 1112 proceeds to Step S208 in a case where no reply signal from the portable device 3 is received, and proceeds to Step S214 in a case where the reply signal from the portable device 3 has been received.

In Step S208, the LF signal transmission processing unit 1111 determines whether or not the timer Tm4 has been timed out. The LF signal transmission processing unit 1111 proceeds to Step S210 in a case where the timer Tm4 has been timed out, and returns to Step S206 and repeats its processing in a case where the timer Tm4 is not timed out.

In Step S210, the LF signal transmission processing unit 1111 determines whether or not the number N1 of retry times is less than a predetermined number N th1 of times. The LF signal transmission processing unit 1111 proceeds to Step S212 in a case where the number N1 of retry times is less than the predetermined number N th1 of times, and ends the current processing in a case where the number N1 of retry times is not less than the predetermined number N th1 of times.

In Step S212, the LF signal transmission processing unit 1111 increments the number N1 of retry times by 1, returns to Step S202, and repeats the processing of Steps S202 to S206.

In Step S214, the LF signal transmission processing unit 1111 transmits the challenge signal to the predetermined region outside the vehicle compartment according to a transmission request from the certification processing unit 1113.

In Step S216, the LF signal transmission processing unit 1111 sets a timer Tm5 corresponding to a standby time of the challenge signal.

In Step S218, the RF signal reception processing unit 1112 determines whether or not the response signal has been received from the portable device 3. The RF signal reception processing unit 1112 proceeds to Step S220 in a case where no response signal is received from the portable device 3, and proceeds to Step S222 in a case where the response signal has been received from the portable device 3.

In Step S220, the LF signal transmission processing unit 1111 determines whether or not the timer Tm5 has been timed out. The LF signal transmission processing unit 1111 returns to Step S218 and repeats its processing in a case where the timer Tm5 is not timed out, and proceeds to Step S210 in a case where the timer Tm5 has been timed out.

In Step S222, the certification processing unit 1113 compares the "response" included in the response signal received by that RF signal reception processing unit 1112 with the decryption result of the "challenge" generated by the certification processing unit 1113, and determines whether or not there is coincidence. The certification processing unit 1113 proceeds to Step S224 in a case where there is coincidence, that is, in a case where the certification of the authenticity of the portable device 3 had succeeded, and returns to Step S210 in a case where there is no coincidence, that is, in a case where the certification of the authenticity of the portable device 3 has failed.

In Step S224, the vehicle-mounted equipment control unit 1114 unlocks the door of the vehicle 2, that is, outputs an unlocking request to the body ECU 20 and ends the current processing.

Subsequently, the smart entry processing in the portable device 3 of FIG. 6 will be described.

In Step S302, the LF signal reception processing unit 5011 determines whether or not the polling signal or the wake signal from the vehicle 2 (vehicle-mounted device 10) has been received. The LF signal reception processing unit 5011 proceeds to Step S304 in a case where the polling signal or the wake signal has been received, and ends the current processing in a case where no polling signal and wake signal are received.

In addition, the portable device 3 shifts from a sleep state to the wake state (that is, wakes up), with the reception of the polling signal or the wake signal as a trigger.

In Step S304, the RF signal transmission processing unit 5012 transmits a reply signal to the vehicle 2 (vehicle-mounted device 10).

In Step S306, the LF signal reception processing unit 5011 sets a timer Tm6 corresponding to a standby time of the challenge signal.

In Step S308, the LF signal reception processing unit 5011 determines whether or not the challenge signal from the vehicle 2 (vehicle-mounted device 10) has been received. The LF signal reception processing unit 5011 proceeds to Step S310 in a case where no challenge signal is received, and proceeds to Step S312 in a case where the challenge signal has been received.

In Step S310, the LF signal reception processing unit 5011 determines whether or not the timer Tm6 has been timed out. The LF signal reception processing unit 5011 returns to Step S308 and repeats its processing in a case where the times Tm6 is not timed out, and ends the current processing in a case where the timer Tm6 has been timed out, and the portable device 3 shifts to the sleep state.

In Step S312, the certification information generating unit 5013 generates the response signal, and transmits a transmission request to the RF signal transmission processing unit 5012.

In Step S314, the RF signal transmission processing unit 5012 transmits the response signal to the vehicle 2 (vehicle-mounted device 10) and ends the current processing, according to the transmission request from the certification information generating unit 5013.

Next, the processing (transmission timing changing processing) of changing the transmission timing of the polling signal of the smart key system 1 related to the present embodiment will be described with reference to FIG. 7.

Figure 7:
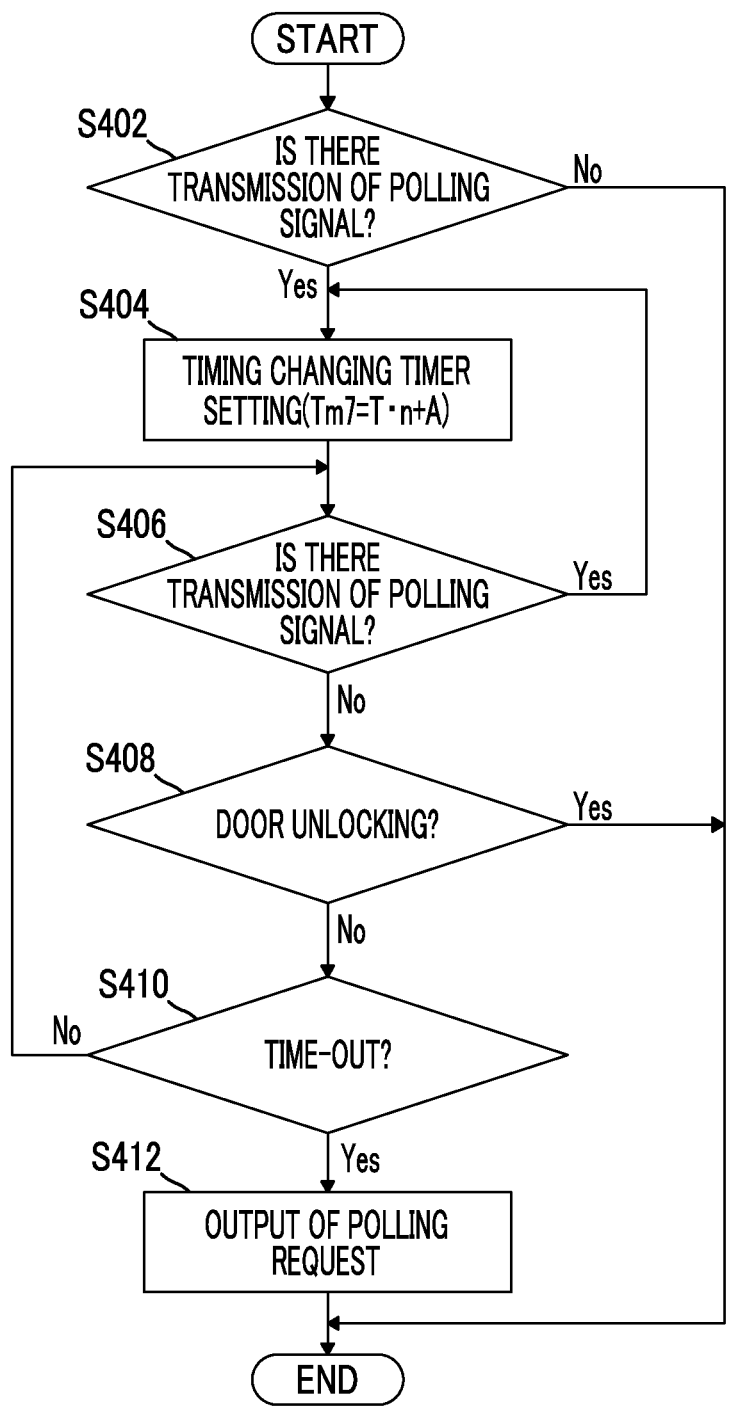
FIG. 7 is a flowchart schematically illustrating an example of transmission timing changing processing in the vehicle-mounted device.

FIG. 7 is a flowchart schematically illustrating an example of the transmission timing changing processing in the vehicle-mounted device 10 (transmission timing changing unit 1115). The processing based the present flowchart is repeatedly executed at predetermined time intervals in a case where the door of the vehicle 2 is locked during the period of the completion of end processing after IG-OFF of the vehicle 2 to IG-ON.

In Step S402, the transmission timing changing unit 1115 determines whether or not the polling signal is transmitted to the predetermined region outside the vehicle compartment by the LF signal transmission processing unit 1111. The transmission timing changing unit 1115 proceeds to Step S404 in a case where the polling signal is transmitted, and ends the current processing in a case where no polling signal is transmitted.

In Step S404, the transmission timing changing unit 1115 sets a timing changing timer Tm7. The timing changing timer Tm7 is set to a time obtained by adding the predetermined time A to an integral multiple of the transmission cycle T of the polling signal (Tm7=T·n+A (Predetermined number n is an integer equal to or greater than 1)).

In addition, the predetermined number n is set such that, in a case where the processing of FIG. 5 has been started immediately after the polling signal relating to Step S402 is transmitted, the timing changing timer Tm7 become longer than the time from the start of the processing to the time when the processing of FIG. 5 is completed without succeeding in the certification of Step S222.

In Step S406, the transmission timing changing unit 1115 determines whether or not the polling signal has been transmitted to the predetermined region outside the vehicle compartment by the LF signal transmission processing unit 1111. The transmission timing changing unit 1115 returns to Step S404, resets the timing changing timer Tm7, and repeats the processing in the present step, in a case where the polling signal has been transmitted. On the other hand, the transmission timing changing unit 1115 proceeds to Step S408 in a case where no polling signal is transmitted.

In Step S408, the transmission timing changing unit 1115 determines whether or not the door of the vehicle 2 has been unlocked. The transmission timing changing unit 1115 proceeds to Step S410 in a case where the door of the vehicle 2 is not unlocked, and ends the current processing in a case where the door of the vehicle 2 has been unlocked.

In Step S410, the transmission timing changing unit 1115 determines whether or not the timing changing timer Tm7 has been timed out. The transmission timing changing unit 1115 returns to Step S406 and repeats the processing of Steps S406, S408 in a case where the timing changing timer Tm7 is not timed out, and proceeds to Step S412 in a case where the timing changing timer Tm7 has been timed out.

In Step S412, the transmission timing changing unit 1115 outputs a polling start request to the LF signal transmission processing unit 1111, and ends the current processing. Accordingly, the processing (first smart entry processing) of FIG. 4 that has ended at the start of the processing (second smart entry processing) of FIG. 5 is resumed. In this case, the LF signal transmission processing unit 1111 transmits the polling signal when the time corresponding to the timing changing timer Tm7 has passed from the transmitting time of the polling signal immediately before the processing of FIG. 5 is started.

According to the transmission timing changing processing of FIG. 7, the transmission of the polling signal in FIG. 4 is resumed if the time corresponding to the timing changing timer Tm7 passes in a situation where the locking of the door of the vehicle 2 continues after the polling signal is transmitted. That is, in a situation where the certification of the authenticity of the portable device 3 is not completed during the execution of processing of FIG. 4, the predetermined manipulation for the manipulating unit 30 is performed and the processing of FIG. 5 has been started. However, in a case where the unlocking of the door of the vehicle 2 caused by the processing of FIG. 5 cannot be performed, the transmission timing is changed by the predetermined time A, and the transmission of the polling signal is resumed.

Next, the working of the smart key system 1 related to the present embodiment will be described with reference to FIGS. 8 and 9.

Figure 8:
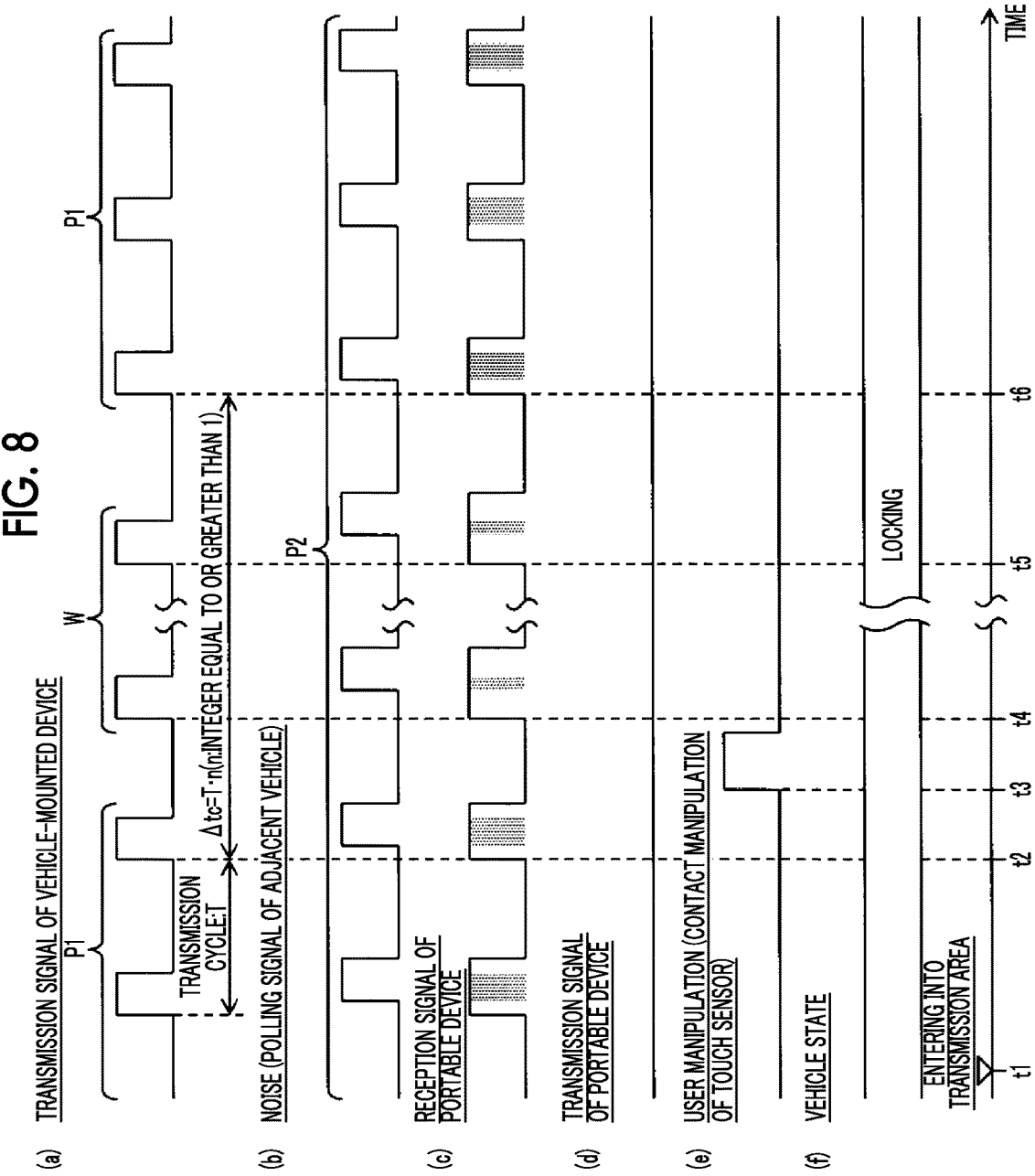
FIG. 8 is a timing chart illustrating an example of the operation of a smart key system related to a comparative example.
Figure 9:
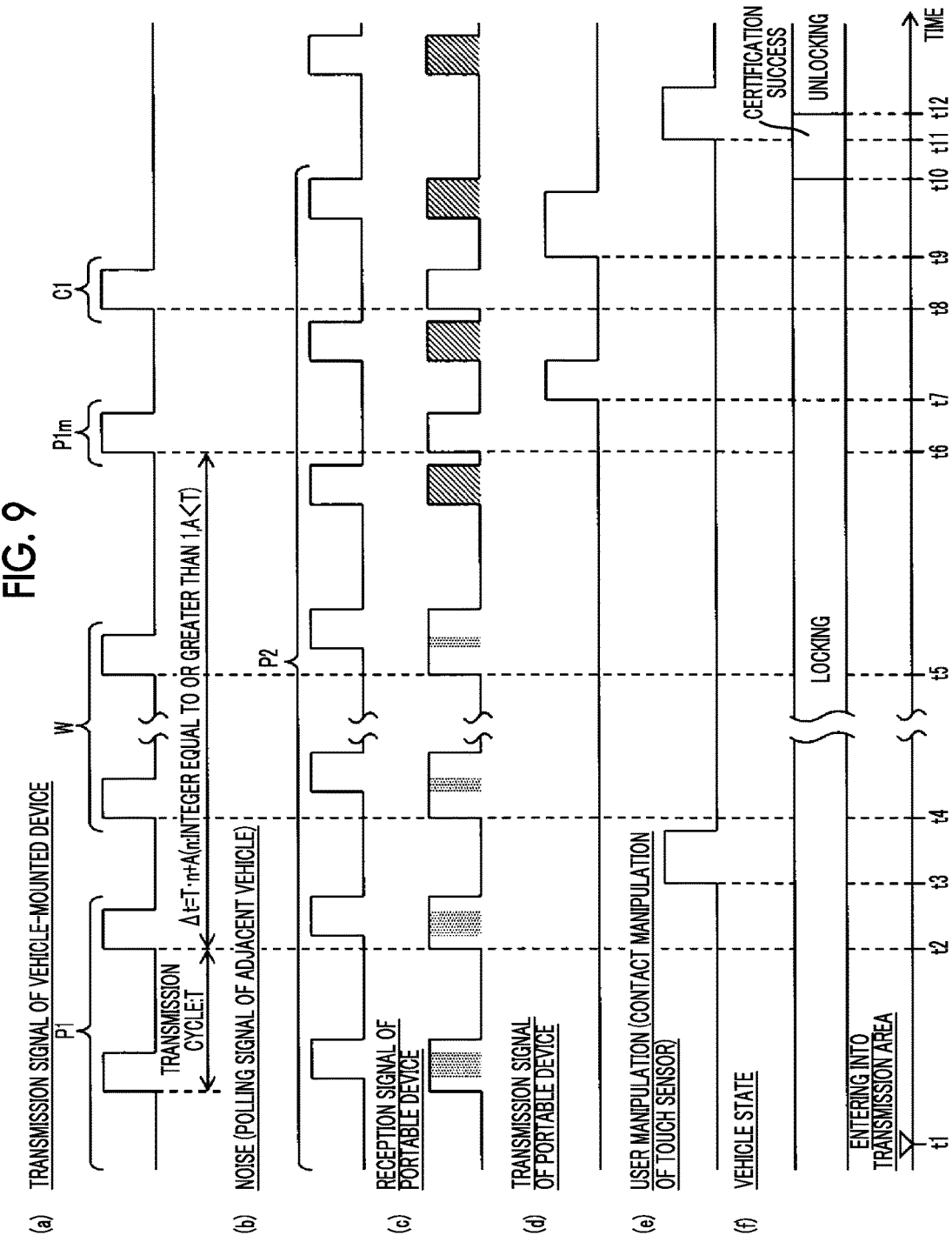
FIG. 9 is a timing chart illustrating an example of the operation of the smart key system related to the present embodiment.

FIGS. 8 and 9 are respectively timing charts illustrating the operation of a smart key system related to a comparative example and the smart key system 1 related to the present embodiment.

The smart key system related to the comparative example executes the processing of FIGS. 4 to 6, similar to the smart key system 1 related to the present embodiment. On the other hand, the smart key system related to the comparative is differs from the smart key system 1 related to the present embodiment, mainly in that this smart key system does not have the transmission timing changing unit 1115 (that is, the processing of FIG. 7 is not performed). More specifically, in the smart key system related to the comparative example, the transmission timing of the polling signal is still the same as the polling signal before the processing of FIG. 5 is started, when the door of the vehicle 2 is not unlocked in the processing (second smart entry processing) of FIG. 5 and the processing (first smart entry processing) of FIG. 4 is resumed. That is, in a case where the processing of FIG. 4 is resumed, the transmission of the polling signal is resumed at a timing wherein a time Δtc (=T·n) of an integral multiple (n times) (1) of the transmission cycle T has passed, on the basis of the transmitting time of the polling signal immediately before the processing of FIG. 5 is started. Hereinafter, regarding the smart key system related to the comparative example, the same constituent elements as the present embodiment will be designated by the same reference signs, and the description thereof will be described.

First, an example of the operation of the smart key system related to the comparative example will be described with reference to FIG. 8.

As illustrated in (a) of FIG. 8, the vehicle-mounted device 10 (LF signal transmission processing unit 1111) transmits a polling signal P1 to the predetermined region (transmission region) outside the vehicle compartment in the transmission cycle T from a time t1 or before (Steps S102 to S108).

Meanwhile, as illustrated in (b) of FIG. 8, another vehicle (hereinafter referred to as an "adjacent vehicle") is parked adjacent to the vehicle 2, and a polling signal P2 in the same LF band is output in an overlapping manner in transmission timing in the same transmission cycle T also from this adjacent vehicle.

Therefore, as illustrated in (c) of FIG. 8, the portable device 3 (LF signal reception processing unit 5011) receives (interferes with) the polling signal P2 as noise in a partially overlapping manner with the polling signal P1. For that reason, even if the user of the vehicle 2 that possesses the portable device 3 at the time t1 enters the predetermined region that is a transmission region of the polling signal P1, the portable device 3 (LF signal reception processing unit 5011) cannot recognize the polling signal P1 correctly (No of Step S302). Therefore, as illustrated in (d) of FIG. 8, since the portable device 3 (RF signal transmission processing unit 5012) transmits no reply signal, the vehicle-mounted device 10 (certification processing unit 1113) does not perform certification processing of the portable device 3, and a situation where the portable device 3 is not certified continues.

After the vehicle-mounted device 10 (LF signal transmission processing unit 1111) transmits the polling signal P1 at a time t2 after the time t1, the user of the vehicle 2 performs the predetermined manipulation (for example, the manipulation of contact of the door handle with the touch sensor) for the manipulating unit 30 at a time t3. However, since the certification of the portable device 3 by the vehicle-mounted device 10 (certification processing unit 1113) is not completed, the first smart entry processing (FIG. 4) in which the polling signal P1 is transmitted ends. Then, the second smart entry processing (FIG. 5) in which a wake signal W is transmitted with the predetermined manipulation for the manipulating unit 30 as a trigger is started.

As illustrated in (a) of FIG. 8, the vehicle-mounted device 10 transmits the wake signal W at a time t4 after the time t3 (Step S202). However, the wake signal W partially overlaps the polling signal P2 in transmission timing, similar to the polling signal P1. Therefore, as illustrated in (c) of FIG. 8, the portable device 3 (LF signal reception processing unit 5011) receives (interferes with) the polling signal P2 as noise in a partially overlapping manner with the wake signal W transmitted at the time t4. For that reason, the portable device 3 (LF signal reception processing unit 5011) cannot recognize the wake signal W correctly (No of Step S302).

Additionally, in a case where the vehicle-mounted device 10 (RF signal reception processing unit 1112) cannot receive the reply signal from the portable device 3, the vehicle-mounted device 10 (LF signal transmission processing unit 1111) repeatedly transmits the wake signal W, that is, performs retry at time intervals corresponding to the above timer Tm4 (Steps S202 to S212). However, as illustrated in (a) of FIG. 8, generally, the transmission (retry) of the wake signal W is repeated in the same cycle as the transmission cycle T of the polling signal. Therefore, the interference between the wake signal W and the polling signal P2 continues. For that reason, as illustrated in (d) of FIG. 8, the portable device 3 (LF signal reception processing unit 5011) cannot continue recognizing the wake signal W correctly. Therefore, as illustrated in (d) of FIG. 8, since the portable device 3 (RF signal transmission processing unit 5012) transmits no reply signal, the vehicle-mounted device 10 (certification processing unit 1113) does not perform the certification processing of the portable device 3, and the situation where the portable device 3 is not certified continues succeedingly.

As illustrated in (a) of FIG. 8, since the number N1 of retry times becomes equal to or more than the predetermined number Nth1 of times if the wake signal W is transmitted at a time t5 after the time t4, the retry is not performed any more (No of Step S210). For that reason, with the door of the vehicle 2 unlocked, the second smart entry processing (FIG. 5) is completed, and the first smart entry processing (FIG. 4) is resumed.

However, as described above, the polling signal P1 after the resumption of the first smart entry processing is transmitted at the same transmission timing as the polling signal P1 before the second smart entry processing is started. For that reason, the polling signal P1 is transmitted at the same transmission timing as the polling signal P2 from the adjacent vehicle and in an overlapping manner with the polling signal P2 in transmission cycle.

Therefore, as illustrated in (c) of FIG. 8, the portable device 3 (LF signal reception processing unit 5011) receives (interferes with) the polling signal P2 as noise in a partially overlapping manner with the polling signal P1. For that reason, even if the first smart entry processing is resumed, the portable device 3 (LF signal reception processing unit 5011) cannot recognize the polling signal P1 correctly (No of Step S302). Therefore, as illustrated in (d) of FIG. 8, since the portable device 3 (RF signal transmission processing unit 5012) does not transmit a reply signal, the vehicle-mounted device 10 (certification processing unit 1113) does not perform the certification processing of the portable device 3, and the situation where the portable device 3 is not certified continues further.

In this way, in the smart key system related to the comparative example, if the noise in the same LF band as a polling signal is transmitted in the same transmission cycle as the polling signal and also overlaps the polling signal in transmission timing, the situation where the portable device 3 cannot receive the polling signal may continue. For that reason, the user may not be able to unlock the door, and convenience may decrease greatly.

In contrast, an example of the operation of the smart key system 1 related to the present embodiment will be described with reference to FIG. 9.

In addition, since the operation during the period of the times t1 to t5 is the same as that of the operation during the period of the time t1 to the time t5 in FIG. 8 (smart key system related to the comparative example), the description thereof will be omitted.

As illustrated in (a) of FIG. 9, since the number N1 of retry times becomes equal to or more than the predetermined number Nth1 of times if the wake signal W is transmitted at the time t5 after the time t4, the retry is not performed any more (No of Step S210). For that reason, with the door of the vehicle 2 unlocked, the second smart entry processing (FIG. 5) is completed. Then, as described above, if a time Δt corresponding to the timing changing timer Tm7 (=T·n+A) passes from the time t2 when the polling signal P1 immediately before the second smart entry processing is started is transmitted, a polling start request is output from the transmission timing changing unit 1115 (Steps S402 to S412). That is, at a time t6 when the time Δt obtained by adding the predetermined time A shorter than the transmission cycle T to a multiple of the predetermined number n (an integer equal to or greater than 1) of the transmission cycle T has lapsed from the time t2, the LF signal transmission processing unit 1111 transmits a polling signal P1m according to the polling start request from the transmission timing changing unit 1115.

The polling signal P1m varies in transmission timing by the predetermined time A shorter than the transmission cycle T with respect to the polling signal P1 before the second smart entry processing is started. Therefore, as illustrated in (a) and (b) of FIG. 9, the overlap of the polling signal P1m in transmission timing with the polling signal P2 transmitted from the adjacent vehicle is solved. For that reason, as illustrated in (c) of FIG. 9, the portable device 3 (LF signal reception processing unit 5011) can discriminate the polling signal P1m (white-painted portion) from the polling signal P2 (hatched portion) transmitted from the adjacent vehicle. That is, the portable device 3 (LF signal reception processing unit 5011) can receive the polling signal P1m at the time t6 (Yes of Step S302).

Thereafter, as illustrated in (d) of FIG. 9, the portable device 3 (RF signal transmission processing unit 5012) transmits a reply signal at a time t7 according to the reception of the polling signal P1m (Step S304).

Thereafter, if the RF signal reception processing unit 1112 of the vehicle-mounted device 10 receives the reply signal from the portable device 3 (Yes of Step S106), as illustrated in (a) of FIG. 9, the LF signal transmission processing unit 1111 of the vehicle-mounted device 10 transmits a challenge signal C1 to the predetermined region outside the vehicle compartment at a time t8 (Step S108).

As illustrated in (a) and (b) of FIG. 9, the challenge signal C1 does not overlap the polling signal P2 transmitted from the adjacent vehicles in transmission timing. For that reason, as illustrated in (c) of FIG. 9, the portable device 3 (LF signal reception processing unit 5011) can receive the challenge signal C1 at the time t8 (Yes of Step S308).

Thereafter, as illustrated in (d) of FIG. 9, the portable device 3 (RF signal transmission processing unit 5012) transmits the response signal to the vehicle 2 (vehicle-mounted device 10) at a time t9 according to the transmission request from the certification information generating unit 5013 (Steps S312 to S314).

Thereafter, if the RF signal reception processing unit 1112 of the vehicle-mounted device 10 receives the response signal (Yes of Step S114), the certification processing unit 1113 of the vehicle-mounted device 10 performs comparison between the decryption result of the "challenge" generated by itself, and the "response". Then, as illustrated in (f) of FIG. 9, the certification processing unit 1113 succeeds in the certification of the authenticity of the portable device 3 at the time t9 (Yes of Step S118).

Thereafter, as illustrated in (e) of FIG. 9, when the user performs the second predetermined manipulation on the manipulating unit 30 at a time t11 (Yes of Step S122), as illustrated in (f) of FIG. 9, the vehicle-mounted equipment control unit 1114 unlocks the door of the vehicle 2 at a time t12 (Step S126).

In this way, in the present embodiment, in a case where the predetermined manipulation has been performed on the manipulating unit 30 in a situation where the certification processing unit 1113 does not certifies the authenticity of the portable device 3, the LF signal transmission processing unit 1111 changes the transmission timing by the predetermined time A shorter than the transmission cycle T, and transmits a polling signal in the transmission cycle T. Therefore, even in a case where a noise source that is in the same band as the polling signal and overlaps the polling signal in transmission cycle and transmission timing is near the vehicle, the overlap of the transmission timing between the polling signal and the noise can be eliminated. For that reason, the portable device 3 is able to discriminate the polling signal from the noise and can receive the polling signal. Additionally, generally, if the user who possesses the portable device 3 enters the predetermined region that is the transmission region of the polling signal, the portable device 3 receives the polling signal and transmits a reply signal to the vehicle. Therefore, the certification of the portable device 3 is first completed, and the predetermined manipulation that is a trigger for unlocking the door of the vehicle 2 by the user is then performed. However, in a case where the predetermined manipulation for the manipulating unit 30 has been performed in a situation where the certification of the portable device 3 is not completed, the portable device 3 can determine that the polling signal cannot be received or the timing when the polling signal is received is delayed, due to the influence of the noise. Therefore, it is possible to change the transmission timing of the polling signal after a need is determined. As a result, since needs, such as waiting for the transmission timing of the polling signal to vary as in the related art, are eliminated, a decrease in a user's convenience can be suppressed. Additionally, since there is also no need such that the portable device always detects noise unlike the related art, a decrease in the battery lifespan of the portable device 3 can also be suppressed. That is, according to the smart key system 1 related to the present embodiment, the influence of noise can be reduced while suppressing a decrease in a user's convenience or a decrease in the battery lifespan of the portable device 3.

In addition, in the present embodiment, in a case where the predetermined manipulation has been performed on the manipulating unit 30 in a situation where the certification of the portable device 3 is not completed, a polling signal is transmitted at a transmission timing when the time obtained by adding the predetermined time A to an integral multiple (≥1) of the transmission cycle T has passed on the basis of a previous polling signal. That is, the polling signal is transmitted at the transmission timing that is later by the predetermined time A than the transmission timing based on the polling signal before the predetermined manipulation is performed on the manipulating unit 30. However, the disclosure is not limited to this configuration. For example, the polling signal may be transmitted at the transmission timing that is faster by the predetermined time A than the transmission timing based on the polling signal before the predetermined manipulation is performed on the manipulating unit 30.

Additionally, in the present embodiment, in a case where the predetermined manipulation has been performed on the manipulating unit 30 in a situation where the certification of the portable device 3 is not completed, the first smart entry processing is completed, and the processing shifts to the second smart entry processing. However, the disclosure is not limited to this configuration. For example, in a case where the predetermined manipulation has been performed on the manipulating unit 30 in a situation where the certification of the portable device 3 is not completed, the second smart entry processing may not be executed, and a polling signal of which the transmission timing is changed by the predetermined time A from a previous polling signal may be immediately transmitted in the transmission cycle T.

Although the embodiments for carrying out disclosure have been described above in detail, the disclosure is not limited to the relevant specific embodiments, and various alterations and changes can be made within the scope of the disclosure described in the claims.

What is claimed is:

1. A smart key system that causes vehicle-mounted equipment to perform a predetermined operation based on two-way communication between a vehicle having the vehicle-mounted equipment and a portable device, the smart key system comprising:
  a first transmitting unit mounted on the vehicle and configured to transmit a polling signal to a predetermined region outside a vehicle compartment of the vehicle in a predetermined transmission cycle;
  a first receiving unit mounted on the vehicle and configured to receive signals transmitted from the portable device;
  a second receiving unit mounted on the portable device and configured to receive signals transmitted from the first transmitting unit;
  a second transmitting unit mounted on the portable device and configured to transmit a reply signal to the vehicle when the second receiving unit has received the polling signal;
  a certification unit mounted on the vehicle and configured to perform certification processing of the portable device when the first receiving unit has received the reply signal; and
  a control unit mounted on the vehicle and configured to cause the vehicle-mounted equipment to perform the predetermined operation when a predetermined manipulation has been performed in the vehicle and the certification unit has certified the portable device,
  wherein, when the predetermined manipulation has been performed in a situation where the certification unit does not certify the portable device, the first transmitting unit transmits the polling signal at a second transmission timing that is offset from a first transmission timing of the polling signal that was transmitted before the predetermined manipulation was performed, by a predetermined time period shorter than the predetermined transmission cycle.

2. The smart key system according to claim 1, wherein the vehicle-mounted equipment is a locking/unlocking device of a door of the vehicle, and the predetermined operation is an unlocking operation of the door.

3. The smart key system according to claim 1, further comprising:
  a transmission timing changing unit mounted on the vehicle and configured to change the transmission timing of the polling signal,
  wherein the transmission timing changing unit is configured to output a polling start request to the first transmitting unit, when the vehicle-mounted equipment does not perform the predetermined operation, until a time obtained by adding or subtracting the predetermined time period to or from a natural number multiple of the predetermined transmission cycle of the polling signal passes from the polling signal before the predetermined manipulation is performed.

4. The smart key system according to claim 3,
wherein the transmission timing changing unit is configured to repeatedly output the polling start request at predetermined time intervals, when the vehicle-mounted equipment does not perform the predetermined operation.

5. The smart key system according to claim 1, wherein
the first transmitting unit is configured to transmit a wake signal for changing the portable device from a power-saving state into a wake state before the polling signal is transmitted, at a transmission timing that is offset from the polling signal transmission timing by the predetermined time period shorter than the predetermined transmission cycle, when the predetermined manipulation has been performed in the situation where the certification unit does not certify the portable device, and
wherein the second transmitting unit is configured to transmit the reply signal to the vehicle, when the second receiving unit has received the wake signal.

6. A smart key system comprising:
a vehicle-mounted device that is mounted on a vehicle, the vehicle-mounted device including a smart electronic control unit; and
a portable device that causes vehicle-mounted equipment of the vehicle to perform a predetermined operation using the vehicle-mounted device based on two-way communication between the vehicle and the portable device, the portable device including a portable device electronic control unit, wherein
the smart electronic control unit is configured to transmit a polling signal to a predetermined region outside a vehicle compartment of the vehicle in a predetermined transmission cycle, and receive signals transmitted from the portable device,
the portable device electronic control unit is configured to receive signals transmitted from the vehicle, and transmit a reply signal to the vehicle when the polling signal has been received, and
the smart electronic control unit is configured to
(i) perform certification processing of the portable device when the reply signal has been received,
(ii) cause the vehicle-mounted equipment to perform the predetermined operation when a predetermined manipulation has been performed in the vehicle and the portable device has been certified, and
(iii) when the predetermined manipulation has been performed in the vehicle and the portable device has not been certified, transmit the polling signal at a second transmission timing that is offset from a first transmission timing of the polling signal that was used before the predetermined manipulation was performed, by a predetermined time period shorter than the predetermined transmission cycle.

* * * * *